United States Patent [19]

Olaniyan

[11] Patent Number: 5,305,704
[45] Date of Patent: Apr. 26, 1994

[54] AUTOMOBILE LOCATOR

[76] Inventor: Olajide O. Olaniyan, 9101 Glenville Rd., Silver Spring, Md. 20901

[21] Appl. No.: 51,665

[22] Filed: Apr. 26, 1993

[51] Int. Cl.$^5$ .......................... B60Q 1/26; G08B 5/00
[52] U.S. Cl. ................................ 116/28 R; 116/209;
40/591; 340/468; 340/472; 340/487; 362/32; 362/80.1
[58] Field of Search ...................... 116/28 R, 173, 209, 116/202; 340/471, 472, 473, 481, 482, 433, 487, 488, 489; 362/32, 80.1; 40/547, 591, 592, 593, 602

[56] References Cited

U.S. PATENT DOCUMENTS

| | | | |
|---|---|---|---|
| 3,191,898 | 6/1965 | McCullough | 116/28 R |
| 3,305,961 | 2/1967 | Lanzon et al. | 40/591 |
| 3,363,600 | 1/1968 | Gary | 116/28 R |
| 3,715,821 | 2/1973 | Hawes | 40/591 |
| 4,110,818 | 8/1978 | Hempsey | 362/32 |
| 4,385,343 | 5/1983 | Plumly | 362/32 |
| 4,833,443 | 5/1989 | Siew | 362/80.1 X |
| 5,036,435 | 7/1991 | Tokuda et al. | 362/31 |
| 5,042,418 | 8/1991 | Hoover et al. | 116/173 |
| 5,165,187 | 11/1992 | Shahidi-Hamedani et al. | 40/547 |

Primary Examiner—William A. Cuchlinski, Jr.
Assistant Examiner—W. Morris Worth
Attorney, Agent, or Firm—S. Michael Bender

[57] ABSTRACT

A new and improved automobile locator apparatus includes a base member adapted to fit onto a top edge of an automobile window, an identifier element, and an adjustable assembly, connected between the base member and the identifier element, for orienting the identifier element with respect to the base member at a variety of selectable orientations. The adjustable orientation assembly includes a first element containing a first uneven surface connected to the base member and a second element containing a second uneven surface connected to the identifier element. A spring urges the first element and the second element together when a selected orientation of the identifier element with respect to the base member has been made. The identifier element may be an internally illuminated flat panel that employs fiber optics. Indicia are placed on top of the internally illuminated flat panel element to provide for specific identification information. A wire retractor may be located between the base member and a source of electrical power for winding wire from the base member and unwinding wire to the base member when the automobile window, to which the base member is fitted, is raised or lowered.

7 Claims, 4 Drawing Sheets

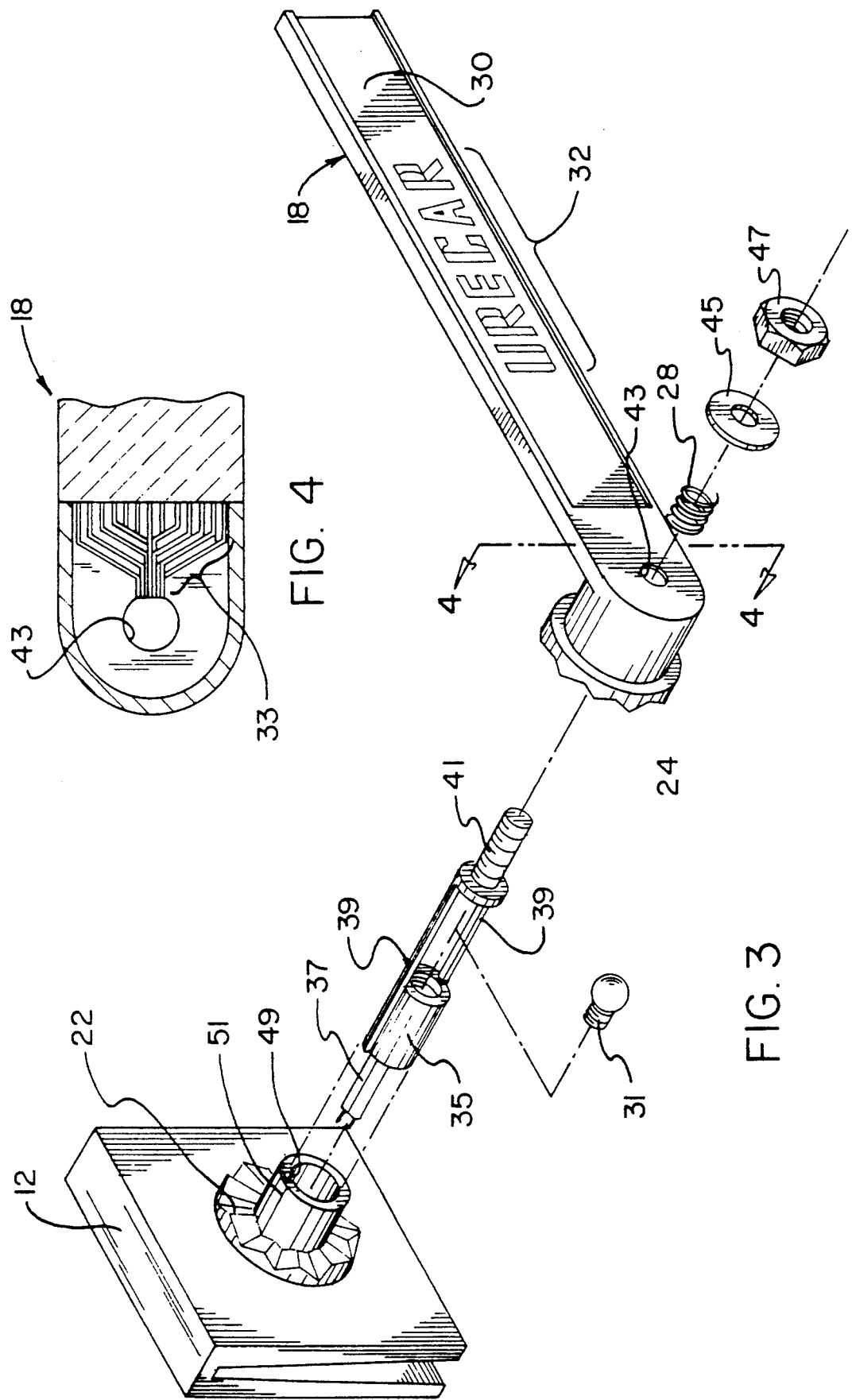

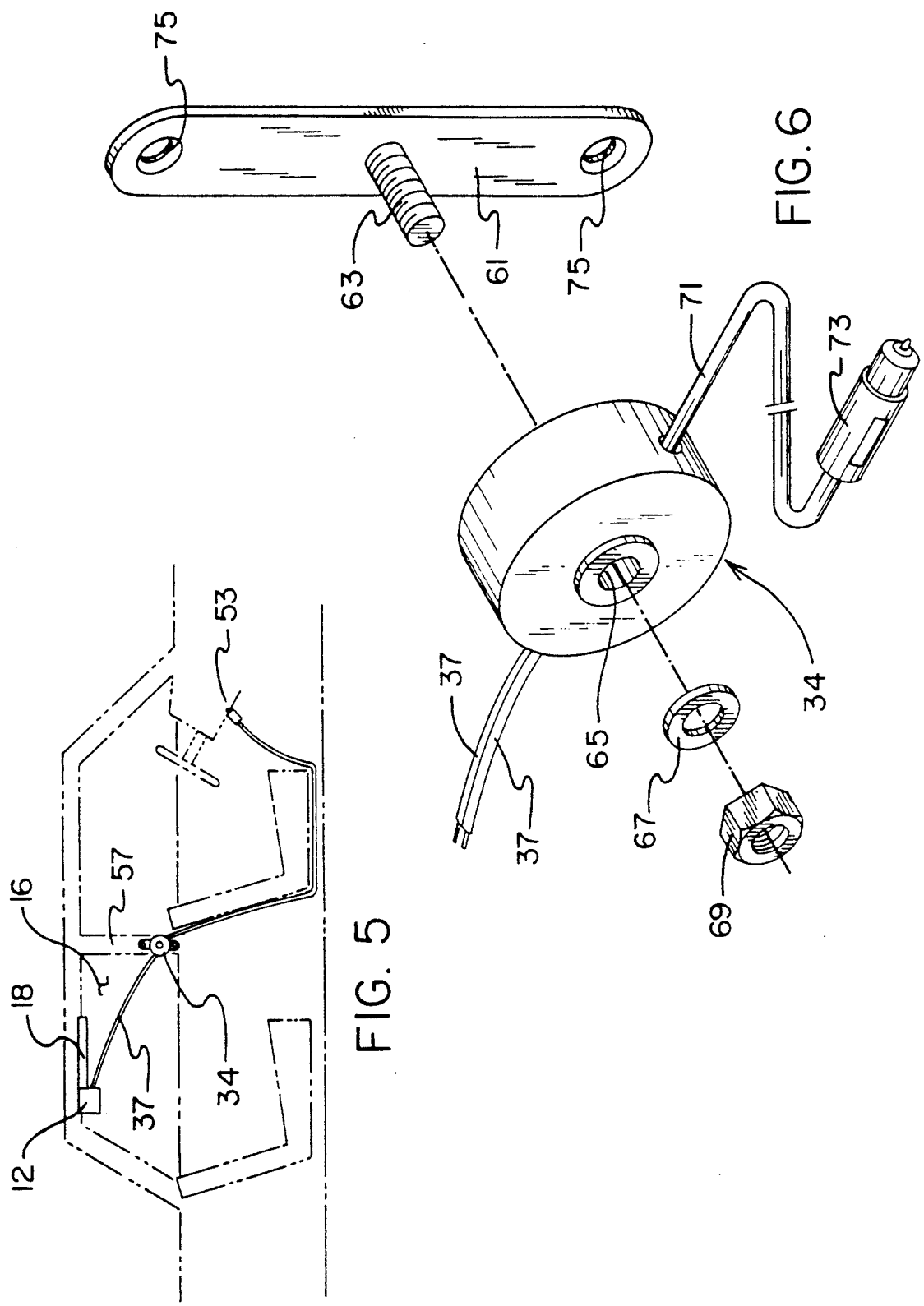

AUTOMOBILE LOCATOR

BACKGROUND OF THE INVENTION

1. Field of the Invention

The present invention relates generally to devices for identifying automobiles, and more particularly, to a device especially adapted to effect locating a specific automobile among a large aggregation of automobiles.

2. Description of the Prior Art

Various types of commercial automobile identifiers are well known in the art, such as those placed on taxi cabs and food delivery vehicles. Although such commercial automobile identifiers identify an automobile as being one of a group of automobiles associated with a specific business, they do not identify a specific automobile belonging to a specific person.

There are also electronic automobile identifiers which employ a transmitter and a receiver which generally activates an automobile's headlights. Although use of such a system causes the headlights of a specific automobile of a specific person to be activated, activation of headlights does not allow for easy identification of a specific automobile especially in day time and especially in a busy area where many automobile headlights are lighted.

Additional automobile locators are disclosed in the following U.S. Pat. Nos.: 3,540,406 of Dexter; 4,015,557 of Schulein; 4,964,360 of Henry; 4,976,410 of Tomaiuolo. These automobile locators provide individual automobile location markers which are generally in the form of a flag on a staff attached to the automobile body. Such flags are not readily visible at night time. In addition, U.S. Pat. No. 3,304,037 of Candela discloses a mounting base for marine antennas.

Moreover, the individual automobile location markers disclosed in the patents cited above share another common characteristic. The flags all stand vertically when in use. This feature can pose a problem. If a number of flags for different automobiles all stand vertically, it may be difficult to differentiate one vertically standing flag from another. In this respect, it would be desirable if an individual automobile locator were provided which had an identifier element which did not necessarily stand vertically when used for automobile identification.

Among the individual automobile locators cited in the U.S. patents cited above, a number are disclosed as being attached to the automobile by being clipped onto the top edge of an automobile window. This is a very convenient way to attach an individual automobile locator to an automobile. However, it would be desirable improvement if an individual automobile locator were provided that clipped onto the top edge of a window, but did not necessarily stand vertically when used for automobile identification, and moreover, was readily visible at night.

Thus, while the foregoing body of prior art indicates it to be well known to use a flag on a staff attached to an automobile body to serve as an individual automobile location marker, the provision of a simple and cost effective device that is readily visible both in the day and the night is not contemplated. Nor does the prior art described above teach or suggest an individual automobile locator which has an identifier element which does not necessarily stand vertically when used for automobile identification. The foregoing disadvantages are overcome by the unique automobile locator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved automobile locator apparatus which includes a base member adapted to fit onto a top edge of an automobile window, an identifier element, and an adjustable assembly, connected between the base member and the identifier element, for orienting the identifier element with respect to the base member at a variety of selectable orientations. The adjustable orientation assembly includes a first element containing a first uneven surface connected to the base member and a second element containing a second uneven surface connected to the identifier element. A spring urges the first element and the second element together when a selected orientation of the identifier element with respect to the base member has been made. The identifier element may be an internally illuminated flat panel that employs fiber optics. Indicia are placed on top of the internally illuminated flat panel element to provide for specific identification information. A wire retractor, may be located between the base member and a source of electrical power, for winding wire from the base member and unwinding wire to the base member when the automobile window, to which the base member is fitted, is raised or lowered.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved automobile locator apparatus which has all of the advantages of the prior art and none of the disadvantages.

It is another object of the present invention to provide a new and improved automobile locator apparatus which may be easily and efficiently manufactured and marketed.

It is a further object of the present invention to provide a new and improved automobile locator apparatus which is of durable and reliable construction.

An even further object of the present invention is to provide a new and improved automobile locator apparatus which is susceptible of a low cost of manufacture with regard to both materials and labor, and which accordingly is then susceptible of low prices of sale to the consuming public, thereby making such automobile locator apparatus available to the buying public.

Still yet a further object of the present invention is to provide a new and improved automobile locator apparatus that is readily visible both in the day and the night.

Still another object of the present invention is to provide a new and improved automobile locator apparatus which has an identifier element which does not necessarily stand vertically when used for automobile identification.

Yet another object of the present invention is to provide a new and improved automobile locator apparatus that clips onto the top edge of an automobile window, that does not necessarily stand vertically when used for automobile identification, and that is readily visible both in day and night.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an exploded, perspective view of a second preferred embodiment of the automobile locator apparatus of the invention.

FIG. 4 is a cross-sectional view of the embodiment of the automobile locator apparatus of the invention shown in FIG. 3 taken along the line 4—4 thereof.

FIG. 5 is a plan view showing a third preferred embodiment of the automobile locator apparatus of the invention installed on the leading edge of a window on an automobile.

FIG. 6 is an enlarged, partially exploded perspective view of the wire retractor of the embodiment of the automobile locator apparatus of the invention shown in FIG. 5.

DESCRIPTION OF THE PREFERRED EMBODIMENT

With reference to the drawings, a new and improved automobile locator apparatus embodying the principles and concepts of the present invention will be described.

Figure 1:
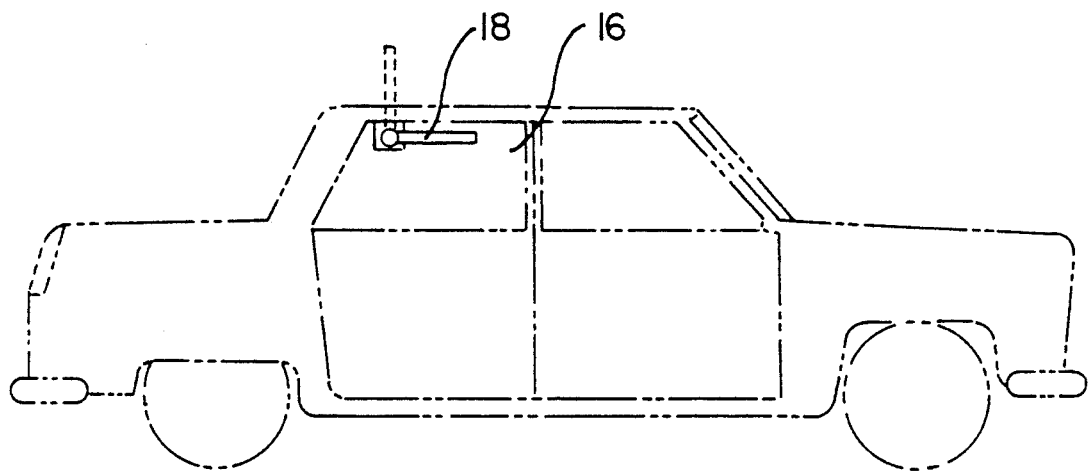
FIG. 1 is a plan view showing a first preferred embodiment of the automobile locator apparatus of the invention installed on the leading edge of a window on an automobile.
Figure 2:
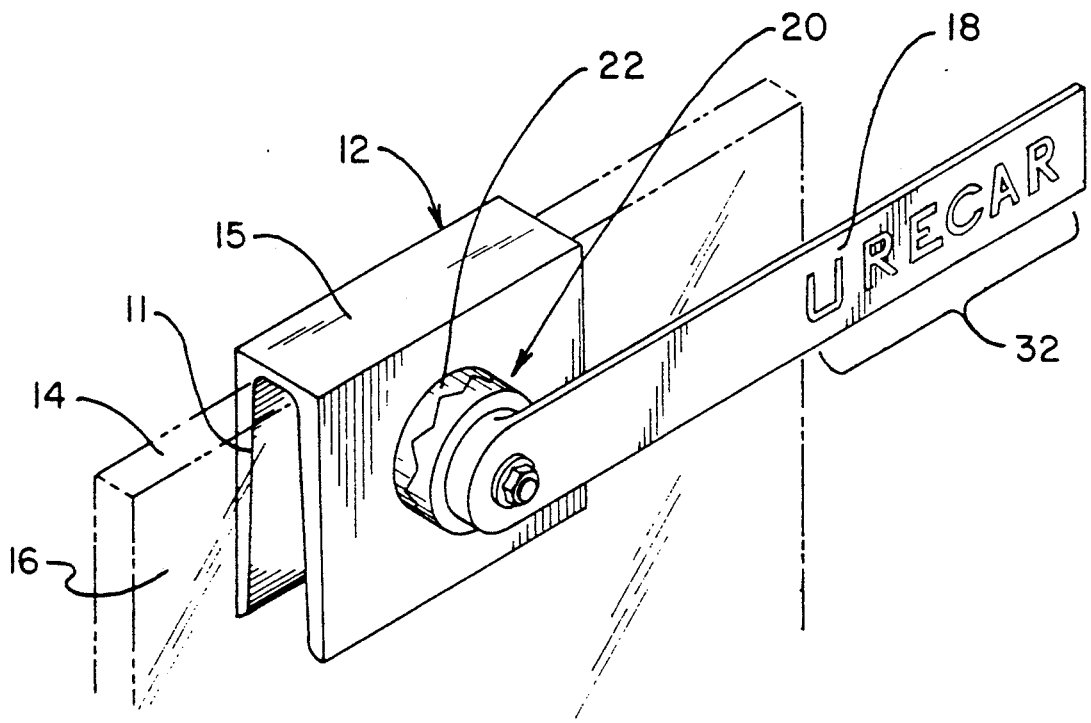
FIG. 2 is an enlarged perspective view of the automobile locator apparatus shown in FIG. 1 removed from the automobile.

Turning initially to FIGS. 1-2, there is shown a first exemplary embodiment of the automobile locator apparatus of the invention generally designated by reference numeral 10. In its preferred form, automobile locator apparatus 10 is comprised of a base member 12 adapted to fit onto a top edge 14 of an automobile window 16, an identifier element 18, and an adjustable assembly 20, connected between the base member 12 and the identifier element 18, for orienting the identifier element 18 with respect to the base member 12 at a variety of selectable orientations. The base member 12 has walls 11, 13, and 15 which straddle a top portion of the automobile window 16. The walls 11 and 13 are formed in such a way that their free ends taper towards each other, thereby exerting a clamping action on the window 16 clamped therebetween. Moreover, the thickness of the walls 11, 13, and 15 is sufficiently thin so that the window 16 can be fully wound up to the top of the window frame while the base member 12 is affixed to the window 16.

More specifically, the adjustable assembly 20 includes a first uneven surface containing element 22 (containing a corrugated surface) connected to the base member 12, a second uneven surface containing element 24 (containing a complementary corrugated surface) connected to the identifier element 18, and a spring 28 (see FIG. 3) for urging the first element 22 and the second element 24 together when a selected orientation of the identifier element 18 with respect to the base member 12 has been made.

In use, when the identifier element 18 is placed in a horizontal orientation with respect to the base member 12, the automobile locator apparatus 10 of the invention is not being used for identification purposes. However, when the identifier element 18 is place in a vertical orientation, or any selectable orientation between vertical and horizontal, the automobile locator apparatus 10 of the invention can be used for identification purposes.

Turning to FIGS. 3-4, a second embodiment of the automobile locator apparatus 10 of the invention is shown. Reference numerals are shown that correspond to like reference numerals that designate like elements shown in the other figures. In addition, in FIGS. 3-4, the identifier element 18 is internally illuminated. More specifically, the internally illuminated identifier element 18 includes an internally illuminated flat panel element 30 which is illuminated by an incandescent lamp 31 powered by the DC power available in a cigarette lighter 53 (see FIG. 5) and an array of optical fibers 33 which extend from the lamp 31 to the full extent of the panel element 30. The internally illuminated flat panel element 30 may be a commercially available fiber optic backlighting element which is as thin as 0.013 inches thick. Such a backlighting element provides uniform backlighting with low power consumption. The optical fibers employed with the invention may be made from plastic or glass, as desired. At least one indicia display 32 is placed on top of one side of the internally illuminated flat panel element 30. Preferably, one indicia display 32 is placed on top of each side of the internally illuminated flat panel element 30. Aside from an incandescent lamp 31, other suitable light sources can be employed such as light emitting diodes.

In FIG. 3, the adjustable assembly 20 includes a first corrugated surface containing element 22 connected to the base member 12, a second complementary corrugated surface containing element 24 connected to the identifier element 18, and a spring 28 for urging the first element 22 and the second element 24 together when a selected orientation of the identifier element 18 with respect to the base member 12 has been made. More specifically, the lamp 31 fits into lamp receiver 35 to which wires 37 are connected, which receive the above-mentioned DC power. Preferably, a suitable groove or other cutout (not shown) is provided on the inside surface of base member 12 in and through which wires 37 are trained so that the wires 37 may extend from outside the automobile (i.e. lamp socket 35) to inside the automobile without interfering with fitment of the base 12 on the edge of the car door window 16. Extending upward from the lamp receiver 35 are two struts 39 which support a threaded bolt member 41.

When the automobile locator apparatus 10 of the invention shown in FIG. 3 is assembled, the threaded bolt member 41 extends through orifice 43 in the identifier element 18. Moreover, the spring 28 is placed over the portion of the threaded bolt member 41 which projects from orifice 43. A washer 45 is placed at the end of the spring 28, and the nut 47 is spun onto the bolt member 41. As the nut 47 is turned onto the bolt member 41, the spring 28 is compressed. The compression of the spring 28 urges the first corrugated surface containing element 22 against the second complementary corrugated surface containing element 24 when a selected orientation of the identifier element 18 with respect to the base member 12 has been made. The spring tension urged by spring 28 keeps the base member 12 and the identifier element 18 in the selected orientation.

To change to a different selected orientation, the identifier element 18 would be grasped and rotated around the bolt member 41 with a sufficient amount of torque to overcome the force exerted by the spring 28 such that the corrugations on the first member 22 ride up and over the corrugations of the second member 24. When a new orientation is selected, the complementary corrugations fit closely against one another as shown in FIG. 2.

Also, when the automobile locator apparatus 10 of the invention shown in FIG. 3 is assembled, one of the struts 39 fits into a complementary slot 49 located in a short tubular extension 51 which extends upward from the corrugated first member 22. Engagement of a strut 39 with the slot 49 prevents the lamp 31 and wires 37 from turning or twisting when the orientation of the identifier member 18 is changed with respect to the base member 12.

If desired, a panel of glass or transparent plastic, such as (PLEXIGLASS), may be placed over the internally illuminated flat panel element 30 to protect the indicia 32 and the element 30.

Turning to FIGS. 5-6, a third embodiment of the automobile locator apparatus 10 of the invention is shown. Reference numerals are shown that correspond to like reference numerals that designate like elements shown in the other figures. In addition, in FIGS. 5 and 6, a wire retractor assembly 34 is located between the base member 12 and a source of electrical power (the cigarette lighter 53), for winding wires 37 from the base member 12 and unwinding wires 37 to the base member 12 when the automobile window 16, to which the base member 12 is fitted, is raised or lowered.

More specifically, the wire retractor assembly 34 is located on automobile column 57. A base plate 61 is attached to the column 57 by fasteners (not shown) through holes 75, and a threaded member 63 projects from the base plate 61. A cylindrical channel 65 is present in the wire retractor assembly 34, and the cylindrical channel 65 is placed over the threaded member 63, a portion of which projects out from the wire retractor assembly 34. A washer 67 and a nut 69 are used to secure the wire retractor assembly 34 to the base plate 61 by spinning the nut 69 onto the threaded member 63. If desired, the base plate 61 can be fastened to another suitable portion of the automobile body such as the roof.

The wire retractor assembly 34 employs well known principles in wire retractors which are well known in the art. Wires 37 run from the wire retractor assembly 34 to the base member 12, and a cable 71 runs from the wire retractor assembly 34 to a plug 73 which is adapted to fit into cigarette lighter 53 to derive DC power therefrom.

Figure 7:
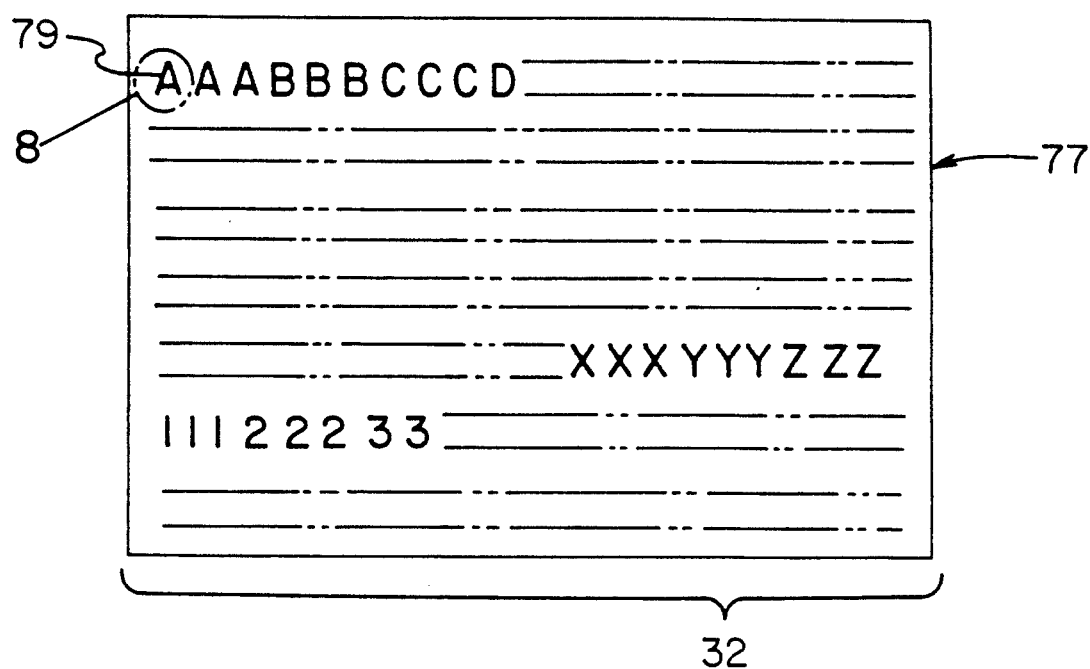
FIG. 7 is an array of removable, adhesive alphanumeric characters that can be used to individualize the embodiments of the automobile locator apparatus of invention.
Figure 8:
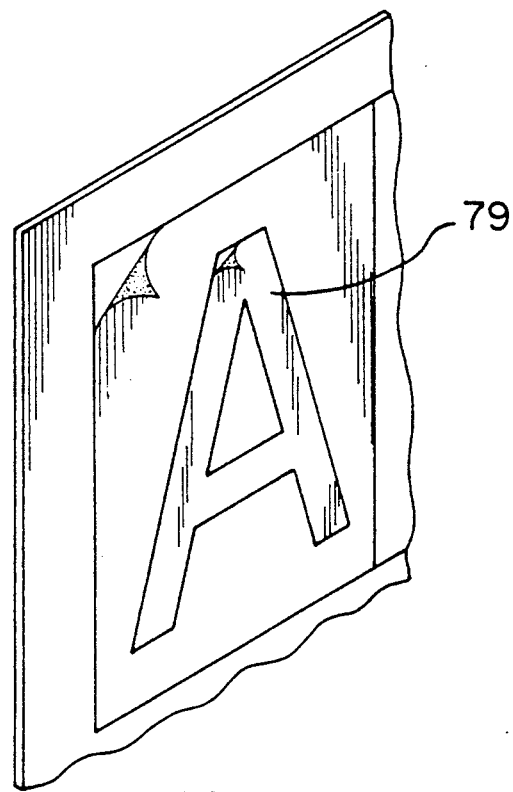
FIG. 8 in an enlarged, perspective view of a removable, adhesive alphanumeric character shown in the circled area 8 of FIG. 7.

Turning to FIG. 7, an array 77 of removable, adhesive alphanumeric indicia 32 characters that can be used to individualize the embodiments of the automobile locator apparatus 10 of invention is shown. The alphanumeric characters can include characters from any language, and they can be in many different colors. The individual alphanumeric characters, such as the letter "A" 79, is removed from the array 77 and adhered to the top of one side of the internally illuminated flat panel element 30 (see FIG. 3). Any suitable identification pattern of indicia 32 can be selected and applied to the internally illuminated flat panel element 30 of the identifier element 18.

The embodiments of the automobile locator apparatus 10 of the invention described above are easily placed on and removed from the top edge of an automobile window. Although the embodiments described above are manually operated, it is also contemplated that small motors may be employed to deploy the identifier element automatically when the automobile door is closed or locked and automatically retracted when the door is next opened. For example, in this regard, connector 73 could be connected through a bistable switch, actuated by locking and unlocking the car's doors, to a small electrical motor adapted to raise the locator when the doors are locked and to lower the locator when the doors subsequently are unlocked. Alternatively, the bistable switch could be programmed to "automatically" raise and lower the locator upon successive opening of one or more car doors. Although the embodiments of the invention disclosed above provide that the light source 31 is placed supported by the base member 12, alternatively, a light source 31 can be placed in the wire retractor assembly 34, and an optical fiber can carry light from the wire retractor assembly 34 to the base member 12 from which the light would be distributed to the optical fibers 33 in the internally illuminated flat panel element 30.

The whole automobile locator apparatus of the invention may be made from rugged, inexpensive, light weight material. Moreover, the automobile locator apparatus of the invention adds little or no vibration to the automobile.

It is apparent from the above that the present invention accomplishes all of the objects set forth by providing a new and improved automobile locator apparatus that is low in cost, relatively simple in design and operation, and which may advantageously be used to locate an individual automobile in day or night.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularly and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved automobile locator apparatus, comprising:
    a base member adapted to fit onto a top edge of an automobile window;
    an internally illuminated identifier element;
    pivot means for connecting said identifier element to said base member, said pivot means having a first member on said base member and a second member on said identifier element;
    illumination source means for providing a source of illumination, wherein said first member serves as a housing for said illumination source means;
    illumination transmission means for transmitting illumination to said identifier element, wherein said second member serves as a housing for said illumination transmission means, wherein said illumination transmission means is connected to said internally illuminated identifier element; and
    electrical conductor means for connecting said illumination source means to an external source of electrical power.

2. The apparatus described in claim 1 wherein said internally illuminated identifier element includes an internally illuminated flat panel element.

3. The apparatus described in claim 1 wherein said internally illuminated identifier element includes:
    an internally illuminated flat panel element;
    at least one indicia display placed on top of said internally illuminated flat panel element.

4. The apparatus described in claim 1, further including:
    wire retractor means, connected to said electrical conductor means between said base member and said source of electrical power, for winding wire of the conductor means from said base member and unwinding said wire to said base member when the automobile window, to which the base member is adapted to be fitted, is raised or lowered.

5. The apparatus described in claim 1, wherein said illumination transmission means comprises optical fibers.

6. The apparatus described in claim 1, wherein said first and second members include cooperating means for orienting said identifier element with respect to said base member at a variety of selectable orientations.

7. The apparatus described in claim 6, wherein said cooperating means for orienting said identifier element includes:
    a first uneven surface on said first member;
    a second uneven surface on said second member; and
    means for urging said first member and said second member together when a selected orientation of said identifier element with respect to said base member has been made.

* * * * *